(12) United States Patent
Lambert et al.

(10) Patent No.: US 9,169,609 B2
(45) Date of Patent: Oct. 27, 2015

(54) REMOVABLE LAMP FOR OUTDOOR POWER EQUIPMENT

(75) Inventors: Matt Lambert, Harrisburg, NC (US); Kyle Franke, Concord, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/127,611

(22) PCT Filed: Jul. 5, 2011

(86) PCT No.: PCT/US2011/042949
§ 371 (c)(1),
(2), (4) Date: Dec. 19, 2013

(87) PCT Pub. No.: WO2013/006166
PCT Pub. Date: Jan. 10, 2013

(65) Prior Publication Data
US 2014/0112010 A1    Apr. 24, 2014

(51) Int. Cl.
| | |
|---|---|
| *F21V 21/00* | (2006.01) |
| *E01H 5/09* | (2006.01) |
| *B60Q 1/00* | (2006.01) |
| *B60Q 1/04* | (2006.01) |
| *B60Q 1/18* | (2006.01) |
| *B60Q 1/24* | (2006.01) |
| *B62D 51/04* | (2006.01) |
| *E01H 5/04* | (2006.01) |
| *F21V 33/00* | (2006.01) |

(52) U.S. Cl.
CPC ............... *E01H 5/098* (2013.01); *B60Q 1/0088* (2013.01); *B60Q 1/0441* (2013.01); *B60Q 1/18* (2013.01); *B60Q 1/24* (2013.01); *B62D 51/04* (2013.01); *E01H 5/045* (2013.01); *F21V 33/00* (2013.01)

(58) Field of Classification Search
USPC .......................................... 362/387, 388, 385
See application file for complete search history.

(56) References Cited

U.S. PATENT DOCUMENTS

| | | | |
|---|---|---|---|
| 1,738,632 A | 12/1929 | Berge | |
| 2,592,856 A | 4/1952 | Brockman | |
| 5,072,339 A | 12/1991 | Shimojo | |
| 5,521,806 A * | 5/1996 | Hutzel et al. ................... | 362/486 |

(Continued)

FOREIGN PATENT DOCUMENTS

| | | |
|---|---|---|
| CN | 2853117 Y | 1/2006 |
| CN | 101126230 A | 2/2008 |

(Continued)

OTHER PUBLICATIONS

Snow Blower—Deluxe 28, printed from http://www.ariens.com/products_snow/s_deluxe_group/s_deluxe_28/pages/default.aspx on Mar. 7, 2011.

(Continued)

*Primary Examiner* — Ali Alavi
(74) *Attorney, Agent, or Firm* — Nelson Mullins Riley & Scarborough LLP

(57) ABSTRACT

An outdoor power equipment device may include a mobility assembly and a mounting receptacle. The mobility assembly may support a device frame of the outdoor power equipment device and enable an operator of the outdoor power equipment device to facilitate movement of the outdoor power equipment device. The mounting receptacle may be coupled to the device frame. The mounting receptacle may include a removable lamp operable to provide light at least when removed from the mounting receptacle.

19 Claims, 9 Drawing Sheets

(56) References Cited

U.S. PATENT DOCUMENTS

| | | |
|---|---|---|
| 5,563,774 A | 10/1996 | Welsch |
| 5,727,865 A | 3/1998 | Caldwell |
| 6,948,299 B2 | 9/2005 | Osborne |
| 7,090,371 B1 | 8/2006 | Bonar |
| 7,344,286 B1 | 3/2008 | Petrie et al. |
| 7,824,061 B1 | 11/2010 | Riedfort et al. |
| 2003/0031023 A1 | 2/2003 | Hutzel |
| 2004/0206557 A1* | 10/2004 | Hanafusa et al. ............ 180/19.3 |
| 2005/0039355 A1 | 2/2005 | Itou et al. |
| 2008/0068849 A1 | 3/2008 | Ostroski et al. |
| 2009/0279291 A1* | 11/2009 | Vieira ........................ 362/198 |

FOREIGN PATENT DOCUMENTS

| | | |
|---|---|---|
| DE | 19822179 A1 | 11/1999 |
| FR | 2686215 A1 | 7/1993 |
| JP | H1113036 A | 1/1999 |

OTHER PUBLICATIONS

2010 Craftsman 30 inch 357 cc Snow Thrower Model 88830 Review, printed from http://www.movingsnow.com/page/15/ on Mar. 7, 2011.

International Search Report and Written Opinion of PCT/US2011/042949 mailed Oct. 21, 2011.

Chapter I International Preliminary Report on Patentability of PCT/US2011/042949 mailed Jan. 7, 2014.

European Search Report and Written Opinion of corresponding application No. 11869180.7 received Jul. 3, 2015, all enclosed pages cited.

* cited by examiner

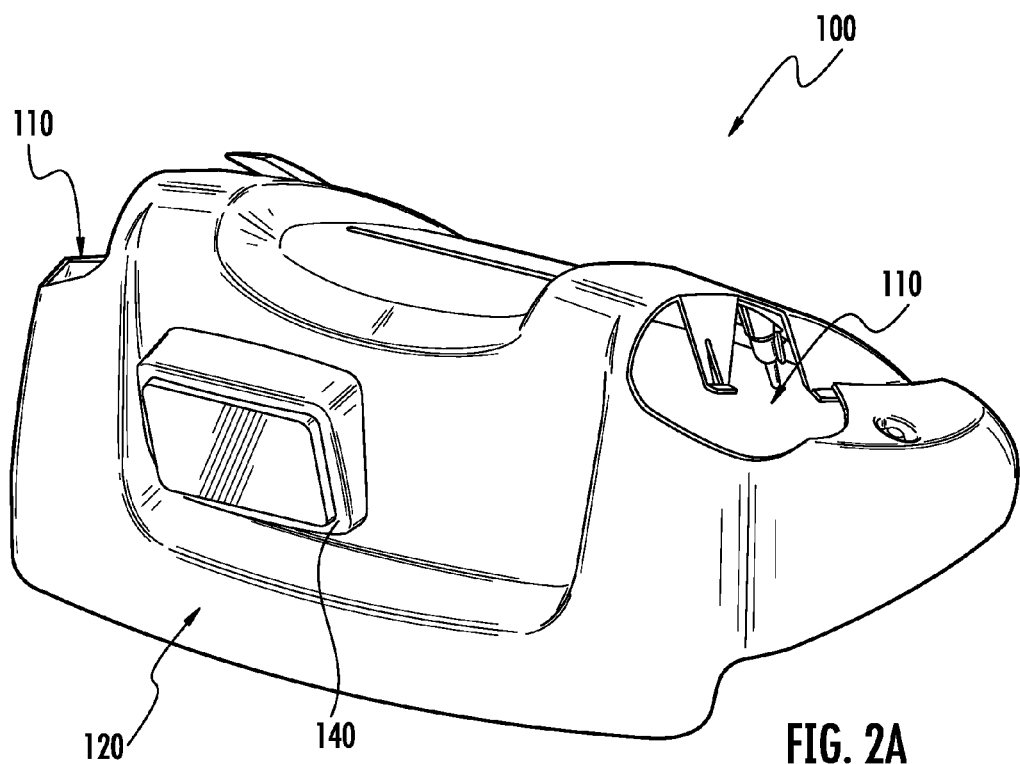

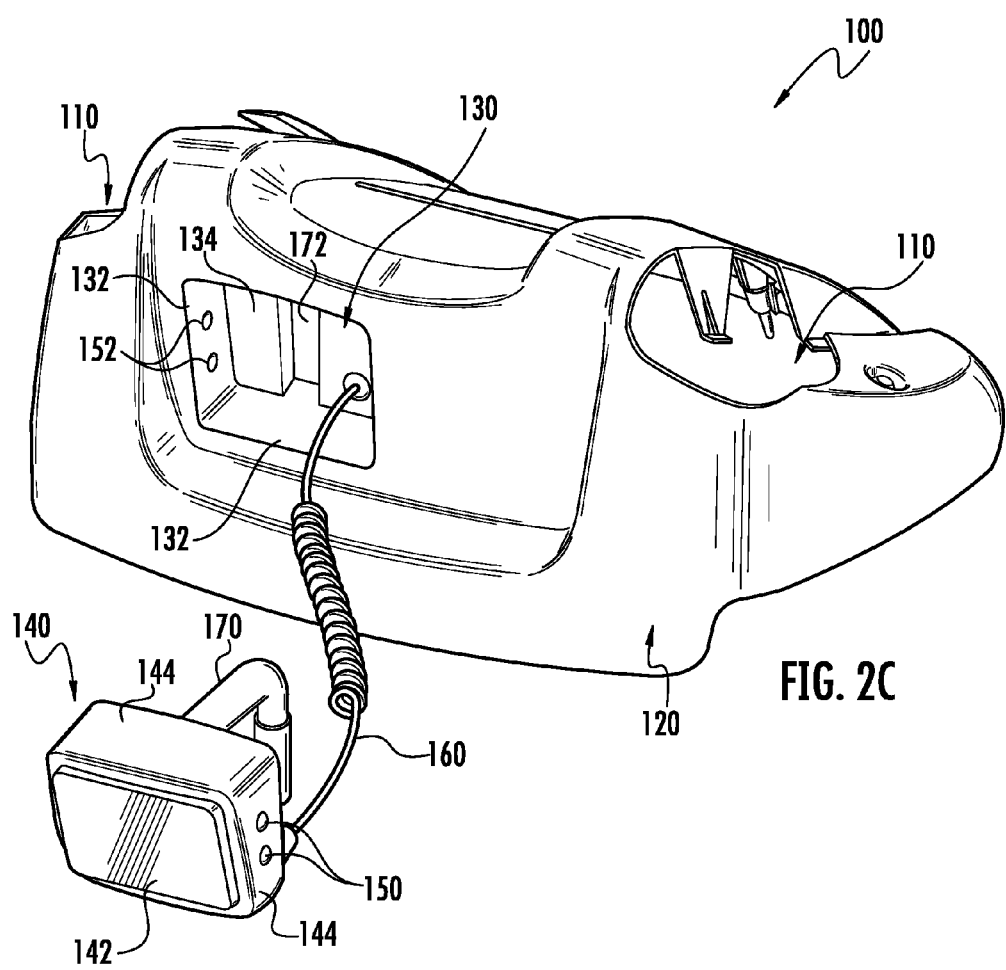

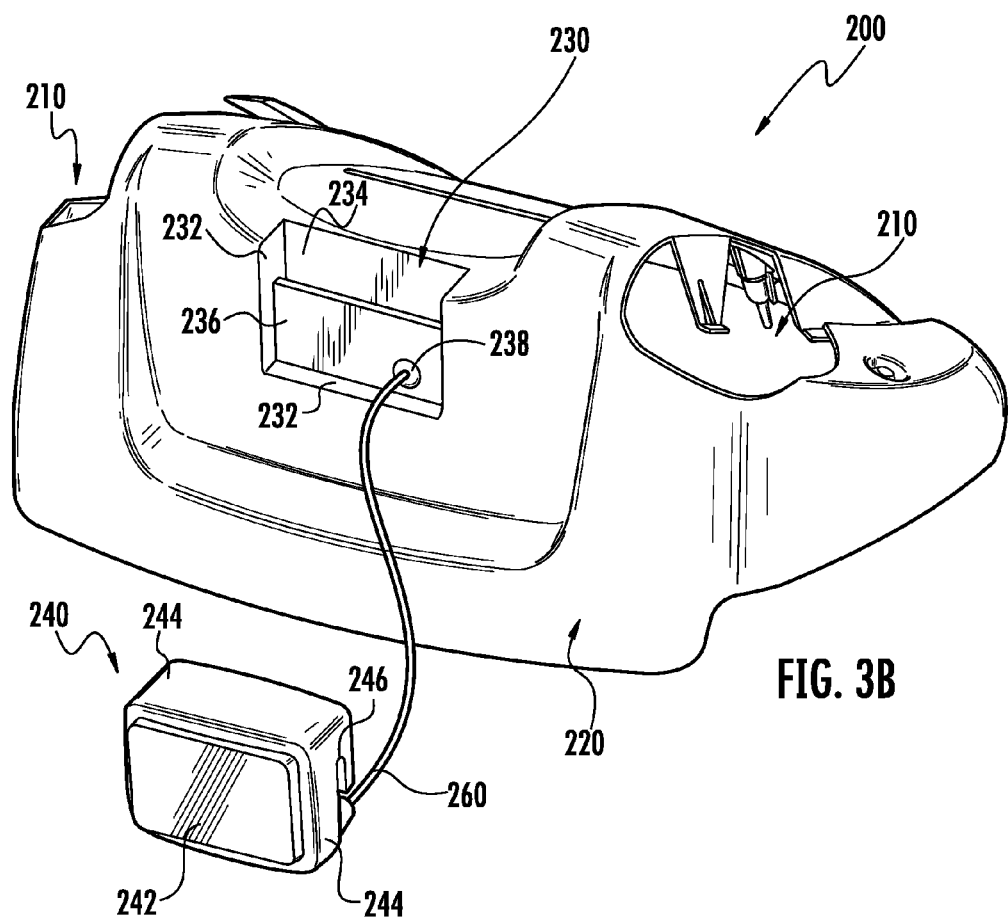

REMOVABLE LAMP FOR OUTDOOR POWER EQUIPMENT

TECHNICAL FIELD

Example embodiments generally relate to outdoor equipment and, more particularly, relate to a removable lamp for use with a walk behind yard maintenance device such as, for example, a snow blower or lawn mower.

BACKGROUND

Lawn care and other outdoor tasks associated with grooming and maintaining property are commonly performed using various tools and/or machines that are configured for the performance of corresponding specific tasks. Certain tasks, like snow removal, are typically performed by snow blowers. Other tasks, like cutting grass, collecting leaves and/or the like, may be performed by lawn mowers. Both lawn mowers and snow blowers may, in some cases, be walk-behind models or may be associated with lawn tractors or other riding lawn care vehicles.

Walk behind snow blowers, lawn mowers and other walk behind yard maintenance devices are popular with many users due to their relative small size and cost. Moreover, since such devices are handled at relatively low speeds under the direct control of the operator, they can sometimes fit into spaces and conduct delicate operations that may be difficult with larger machines. Thus, walk behind yard maintenance devices are likely to continue to be popular, and the demand for such devices having improved functionality will likely grow.

BRIEF SUMMARY OF SOME EXAMPLES

Accordingly, in order to improve operator satisfaction in connection with using walk behind products by providing expanded capabilities, some example embodiments may provide a removable lamp for walk behind products or walk behind yard maintenance devices. Such a removable lamp may be useful to operators for lighting a path in front of the walk behind yard maintenance device or for enabling the operator to direct light to various other locations on or proximate to the walk behind yard maintenance device without moving the walk behind yard maintenance device itself.

In one example embodiment, an outdoor power equipment device is provided. The outdoor power equipment device may include a mobility assembly and a mounting receptacle. The mobility assembly may support a device frame of the outdoor power equipment device and enable an operator of the outdoor power equipment device to facilitate movement of the outdoor power equipment device. The mounting receptacle may be coupled to the device frame. The mounting receptacle may include a removable lamp operable to provide light at least when removed from the mounting receptacle.

In another example embodiment, an accessory panel of an outdoor power equipment device is provided. The accessory panel may include a removable lamp and a reception cavity. The removable lamp may be detachably connectable to the accessory panel. The reception cavity may be disposed in the accessory panel to receive at least three lamp sidewalls of the removable lamp responsive to insertion of the removable lamp into the reception cavity. The removable lamp may be operable to provide light at least when removed from the reception cavity.

Some example embodiments may improve an operator's ability to flexibly provide lighting to various areas on and around a walk behind product. The user experience associated with operating the walk behind product may therefore be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2A illustrates a perspective view of an example removable lamp disposed in an accessory panel in the form of a walk behind product console according to an example embodiment;

FIG. 2C illustrates a modification to the example embodiment of FIG. 2B in which the removable lamp includes a handle according to an example embodiment;

FIG. 3B illustrates a perspective view of the removable lamp of FIG. 3A removed from a reception cavity of the console according to an example embodiment;

DETAILED DESCRIPTION

Figure 1:
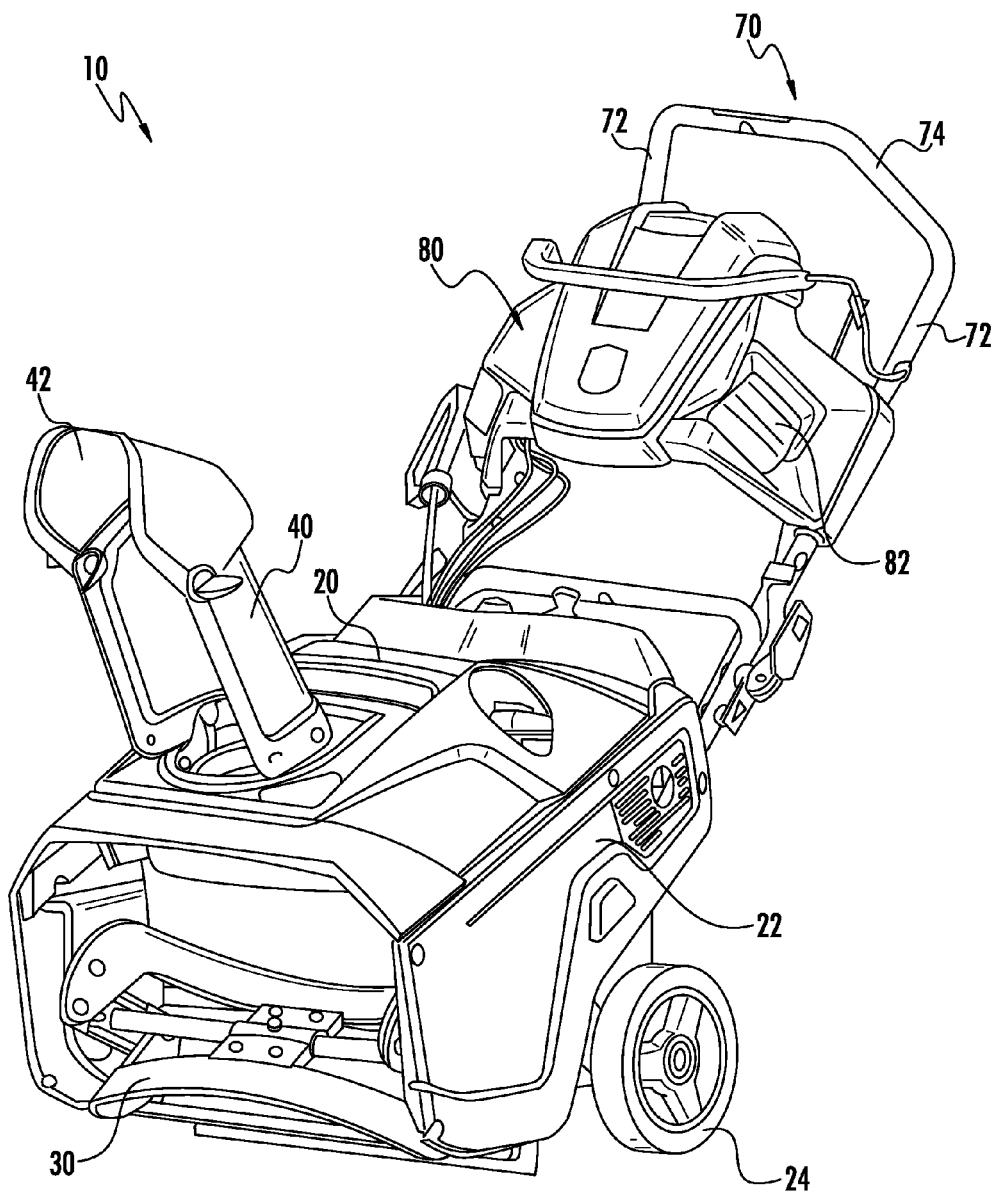
FIG. 1 illustrates a perspective view of the front of a snow blower as an example of one walk behind product with which an example embodiment may be employed.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

Some example embodiments may improve an operator's experience associated with operating a snow blower, lawn mower, tiller, trimmer, brush cutter or other walk behind yard maintenance device (collectively referred to herein as walk behind products). In this regard, some example embodiments may provide for the inclusion of one or more lights for a walk behind product. Moreover, the one or more lights may be removable (referred to hereinafter as removable lamps) to facilitate focusing a light beam either on a path in front of the walk behind product, toward a specific part of the walk behind product, or toward any other item that may be proximate to the walk behind product without moving the walk behind product itself. In some cases, the removable lamp may receive power from the walk behind product itself. However, in other example embodiments, the removable lamp may be battery powered (e.g., using disposable or rechargeable batteries). It should also be appreciated that some embodiments may apply more generally to outdoor power equipment including walk behind products and ride-on products such as lawn tractors, riding lawn mowers or other such devices that include a frame and are supported by a mobility assembly (e.g., wheels, continuous tracks or other components that support the weight of a device and also form the structure via which the device moves).

FIG. 1 illustrates a perspective view of the front of a snow blower 10 as an example of one walk behind product with which an example embodiment may be employed. However, it should be appreciated that example embodiments may also be practiced in connection with any other walk behind product that may benefit from having a removable lamp, such as a lawn mower or the like. Thus, the snow blower 10 should be seen as merely one example device on which an example embodiment may be practiced. Some of the components of the snow blower 10 may be similar in form and function to corresponding components of other walk behind products. However, those components that have different form or function than similar components on other walk behind products, and those components that are unique to the snow blower 10, should not be seen as limiting example embodiments. Instead, specific components are illustrated and described simply to more fully describe one example embodiment and not for purposes of limiting example embodiments of the invention. A description of various components of the snow blower 10 will now be described in reference to FIG. 1. However, it should be appreciated that although FIG. 1 illustrates a snow blower, example embodiments may alternatively be practiced on lawn mowers, tillers, trimmers, brush cutters or other walk behind yard maintenance devices, and also on other outdoor power equipment devices such as ride-on yard maintenance vehicles.

Referring now to FIG. 1, in some embodiments, the snow blower 10 may include a hood assembly 20. The hood assembly 20 may be either removable or rotatable to expose engine components and/or other snow blower components. The hood assembly 20 may be configured to mate with side panels 22 between which engine components and/or ejection system components may be disposed. In some embodiments, the snow blower 10 may include a mobility assembly 24 on which a substantial portion of the weight of the snow blower 10 may rest, when the snow blower 10 is operated. The mobility assembly 24 may also provide for mobility of the snow blower 10 responsive to pushing or self propulsion of the snow blower 10. In this regard, for example, drive power may be selectably provided from the engine to the mobility assembly 24 in some cases. Although the mobility assembly 24 of the pictured example includes two wheels, it should be appreciated that the mobility assembly 24 of other example embodiments may alternatively include a pair of continuous tracks or a different arrangement or number of wheels. For a lawn mower, four wheels positioned around a cutting deck is a common arrangement for the mobility assembly 24.

The example shown in FIG. 1 is a single stage snow blower. Thus, the ejection system of this example includes auger blade 30 providing the only stage for snow removal. When removing snow, the auger blade 30 may be operatively coupled to the engine of the snow blower 10 such that the auger blade 30 may be selectively rotated about an axis that extends in a direction oriented between the side panels (and therefore parallel to the surface of the ground). Snow may be drawn inwardly and then ejected through a discharge chute 40. It should be appreciated, however, that example embodiments could also be used in connection with dual stage snow blowers in some cases.

The discharge chute 40 may include a chute deflector 42 that may be adjusted up and down to control the height of the discharge stream of snow that is ejected via the discharge chute 40. In an example embodiment, the discharge chute 40 may be locally or remotely repositioned by the operator. In an example embodiment, the snow blower 10 may further include a control panel 60, which may include ignition controls and/or other controls or informational gauges. The control panel 60 may be provided to be accessible from the rear of the snow blower 10 by an operator standing or walking behind the snow blower 10 (e.g., at an operator's station) and capable of pushing, steering or otherwise controlling movement of the snow blower 10 using a handlebar assembly 70 or some other steering assembly. In some examples, the handlebar assembly 70 may include at least two arms 72 that may extend up and rearward away from the side panels 22 to provide a structure for an operator to hold to facilitate direction and operation of the snow blower 10. The arms 72 may extend substantially parallel to each other and may be positioned to extend at an angle of between about 30 degrees to 60 degrees from the horizontal, back toward an operator standing or walking behind the snow blower 10 at the operator's station. In some cases, the angle at which the arms 72 extend may be adjustable for operator comfort. In an example embodiment, the arms 72 may include handles at the end of each respective one of the arms 72. The handles may include controls for snow blower 10 operation in some cases. In an example embodiment, a cross bar 74 may extend between distal ends of the arms 72 to provide an additional hand rest option for the operator. Controls for the snow blower 10 may also or alternatively be provided on or in connection with the cross bar 74 in some embodiments. The cross bar 74 may also provide support for the distal ends of the arms 72.

In some example embodiments, the snow blower 10 may further include an accessory panel such as console 80 disposed to extend between the arms 72. In some example embodiments, such as embodiments where separate handles are positioned at the ends of the arms 72, the console 80 may provide some degree of structural support for distal ends of the arms 72. Alternatively or additionally, the console 80 may provide a structure to which accessories or components of the snow blower 10 may be added. For example, in some embodiments, the console 80 may provide a structure for supporting one or more lights 82. In some embodiments, the lights 82 may be fixed and a separate removable lamp according to an example embodiment may be provided. However, in still other embodiments, one or more of the lights 82 may be removable in accordance with an example embodiment.

Figure 2B:
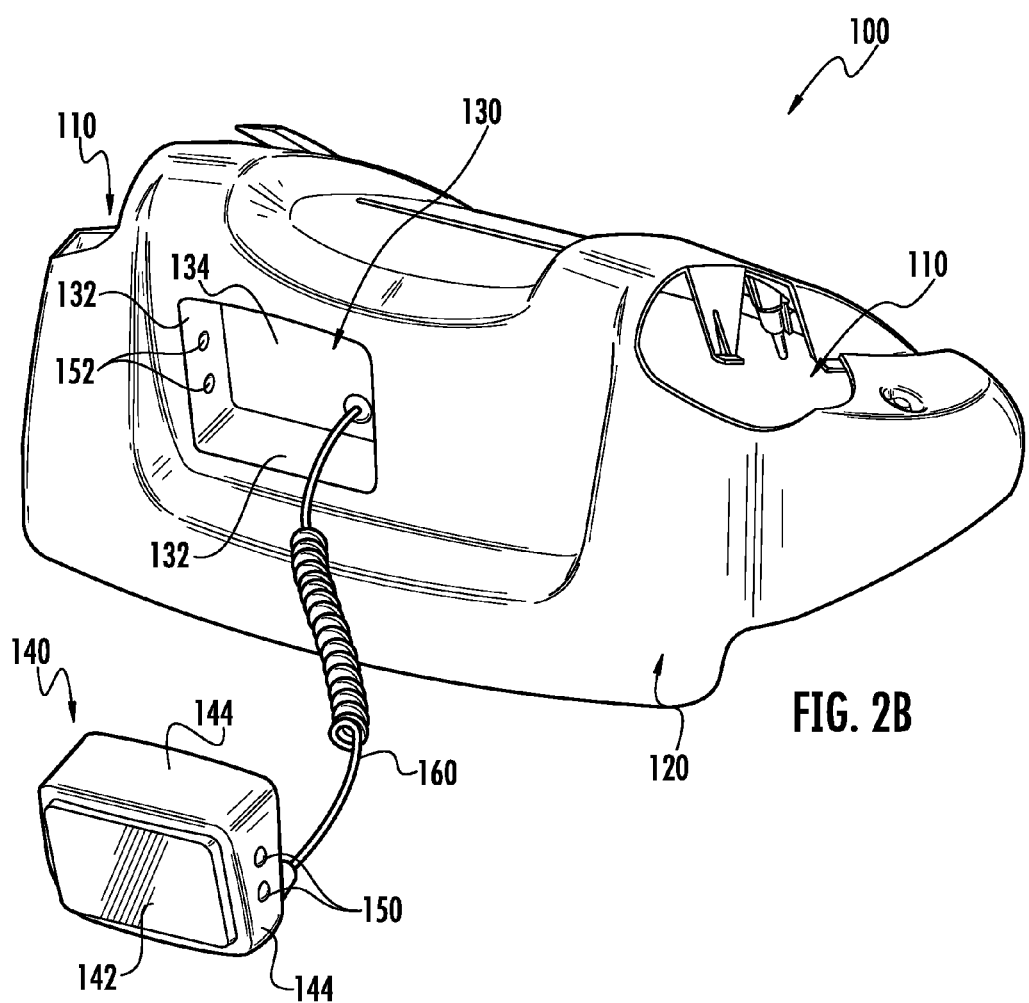
FIG. 2B illustrates a perspective view of the removable lamp of FIG. 2A removed from a reception cavity of the console according to an example embodiment.

FIG. 2, which includes FIGS. 2A, 2B and 2C, illustrates an example embodiment in which a removable lamp may be housed or detachably stored at a portion of an accessory panel in the form of a console that could be part of a snow blower (e.g., snow blower 10), a lawn mower, tiller, trimmer, brush cutter or other walk behind product. However, it should be appreciated that the removable lamp (and the accessory panel) could alternatively be housed or detachably stored at other portions of the walk behind product. For example, rather than being detachably stored at a console, the removable lamp may be detachably stored at an accessory panel located at or taking the form of a control panel, hood assembly, or side panel. Moreover, in some embodiments, the accessory panel may be provided in association with or proximate to a handlebar assembly of the walk behind product.

Furthermore, the accessory panel itself may be an example of a mounting receptacle that may house the removable lamp more generally. Thus, the example shown in FIG. 2 is provided along with the examples shown in FIGS. 3 and 4 merely by way of example and not of limitation in this regard.

FIG. 2A illustrates a perspective view of an example removable lamp disposed in an accessory panel in the form of a walk behind product console according to an example embodiment. FIG. 2B illustrates a perspective view of the removable lamp of FIG. 2A removed from a reception cavity of the console according to an example embodiment. FIG. 2C illustrates a modification to the example embodiment of FIG. 2B in which the removable lamp includes a handle according to an example embodiment.

As shown in FIG. 2, a console 100 may be provided for positioning between, or otherwise in connection with, arms of a handlebar assembly. The console 100 includes receiving holes 110 through which arms, handles, or other portions of a handlebar assembly may be passed. The handlebar assembly may be a portion of the frame of the walk behind product or may be directly or indirectly coupled to the frame of the walk behind product. As such, the console 100 (or accessory panel) may be coupled to the frame (directly or indirectly).

The console 100 may include a face 120 including a reception cavity 130 for receiving a removable lamp 140. The face 120 of the console 100 may be oriented in any desirable direction relative to the handlebar assembly, or other component(s) to which the console 100 may be coupled or affixed. As such, for example, the face 120 may be forward or rear facing relative to motion of the walk behind product in association with which the console 100 is provided. Alternatively, the face 120 may be a top face, bottom face or side face of an accessory panel associated with a different portion of the walk behind product. In cases where the face 120 is forward facing, the reception cavity 130 may be disposed on the face 120 in a manner that directs or aims light from the removable lamp 140 toward an area proximate to a front end of the walk behind product. Thus, for example, when stowed, the removable lamp 140 may be aimed by default to light a pathway in front of the walk behind product. As such, the removable lamp 140 of some embodiments may be disposed in a reception cavity disposed in a headlight position with respect to the walk behind product or other outdoor power equipment device on which the removable lamp 140 is employed. Moreover, in some cases, even when stowed, the removable lamp 140 may be held within the reception cavity 130 with sufficient tolerance to enable the removable lamp 140 to be adjustable upward or downward within the reception cavity 130.

A body of the removable lamp 140 may have any of a number of geometric shapes. For example, the removable lamp 140 may be substantially rectangular prism shaped, cylindrical or various other shapes and the reception cavity 130 may be correspondingly shaped to receive the removable lamp 140. In the example of FIG. 2, the removable lamp 140 has a rectangular prism shape with a front face 142 from which light is emitted, four lamp sidewalls 144, and a back face. When inserted into the reception cavity 130 for stowage, the back face may be completely disposed within the reception cavity 130 and at least a portion of each of the lamp sidewalls 144 may also be disposed within the reception cavity 130. The front face 142 may be completely outside of the reception cavity 130 when the removable lamp 140 is stowed.

The reception cavity 130 may include sidewalls 132 and a back wall 134. The sidewalls 132 of the reception cavity 130 may be configured to correspond to the shape of the removable lamp 140. In particular, the sidewalls 132 may be shaped to correspond to the shape of respective ones of the lamp sidewalls 144 with which each of the sidewalls 132 comes into contact when the removable lamp 140 is stowed. The lamp sidewalls 144 of this example embodiment may define an external periphery of the removable lamp 140 that is slightly smaller in size than an internal periphery of the reception cavity 130 defined by the sidewalls 132.

In some embodiments, the removable lamp 140 may be snapped, slid or otherwise placed into detachable coupling or connection with the reception cavity 130. In one such example, which is shown in FIG. 2, the removable lamp 140 may be snapped into detachable connection with the reception cavity 130 via a snap assembly, which may include a combination of detents or other protrusions configured to fit with corresponding detent receivers or other cavities. As such, for example, one or more of the sidewalls 132 may include one or more detents and a corresponding one or more of the lamp sidewalls 144 may include detent receivers positioned to couple with the one or more detents when the removable lamp 140 is disposed in the reception cavity 130. Alternatively, as shown in FIG. 2B, the removable lamp 140 may include detents 150 positioned on one or more of the lamp sidewalls 144. The detents 150 may be configured to couple to corresponding detent receivers 152 disposed within the sidewalls 132. Of note, the detents 150 pictured in FIG. 2B may couple with detent receivers obscured from view, while the detent receivers 152 pictured in FIG. 2B may couple with detents on a lamp sidewall that is opposite to the lamp sidewall 144 having the detents 150 shown in FIG. 2B. It should also be appreciated that detents and detent receivers may also or alternatively be positioned at other sidewalls or even in the back wall.

In an example embodiment, the removable lamp 140 may receive power from a power source associated with the walk behind product itself. For example, the removable lamp 140 may operate using power generated by the walk behind product, or use power from a battery of the walk behind product. In examples where the removable lamp 140 uses power from the walk behind product, the removable lamp 140 may include a power cord 160. In an example embodiment, the power cord 160 may be a coiled cord that may be stretchable, but may retract to some degree when not being stretched. In some embodiments, the reception cavity 130 may be sized such that it is large enough to fit the removable lamp 140 therein along with an entirety of the power cord 160. For example, the power cord 160 may fit entirely behind the removable lamp 140 and not be visible when the removable lamp 140 is stowed in the reception cavity 130. The power cord 160 may attach to the back wall of the removable lamp 130 (or a lamp sidewall in other examples) and connect to the back wall 134 of the receiving cavity 130 (or one of the sidewalls in other examples).

The removable lamp 140 may include textured or embossed patterns over at least a portion of the lamp sidewalls 144 to facilitate gripping of the removable lamp 140 to aid in removal from the reception cavity 130. Moreover, the textured or embossed patterns on the lamp sidewalls 144 may facilitate gripping the removable lamp 140 when using the removable lamp 140. However, some example embodiments may further facilitate holding onto the removable lamp 140 when it is removed from the reception cavity 130 by adding a handle 170 to the removable lamp 140. In the example shown in FIG. 2C, the handle 170 is disposed at a back side of the removable lamp 140 (e.g., extending off of the back face of the removable lamp 140 in a direction substantially perpendicular to a surface of the back face). In such an example, the back wall 134 of the reception cavity 130 may include a handle receiver 172 comprising an opening or further cavity within the reception cavity 130 that is sized appropriately to fit the handle 170.

Figure 3A:
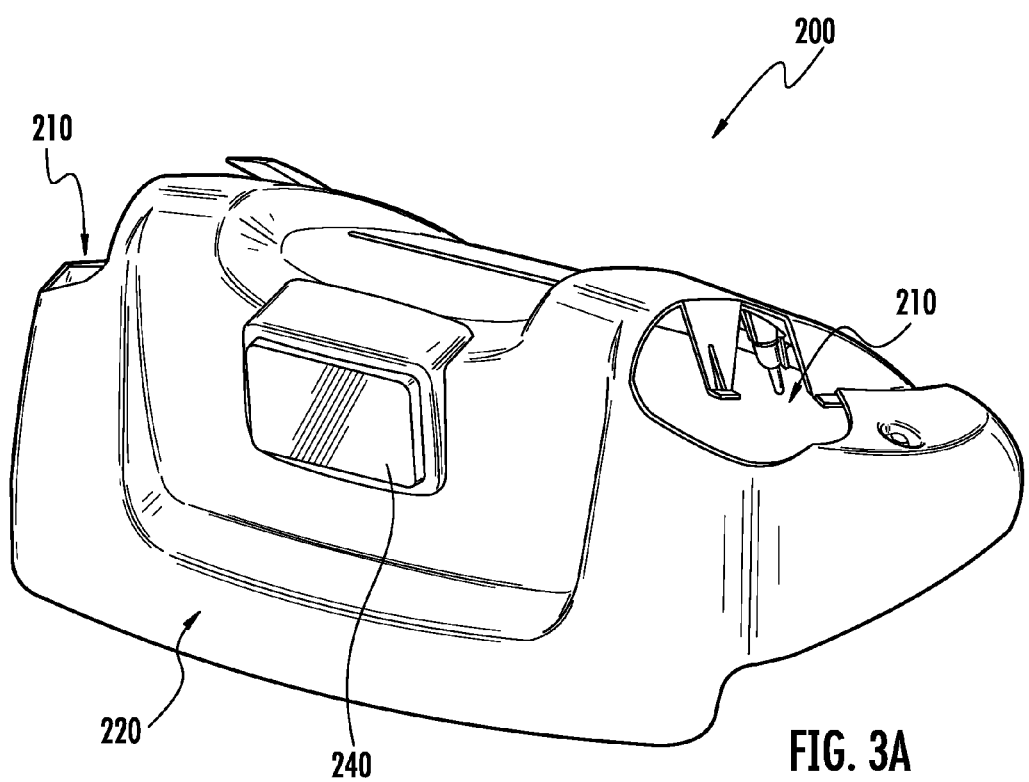
FIG. 3A illustrates a perspective view of an example removable lamp disposed in an accessory panel in the form of a walk behind product console according to an example embodiment.
Figure 3C:
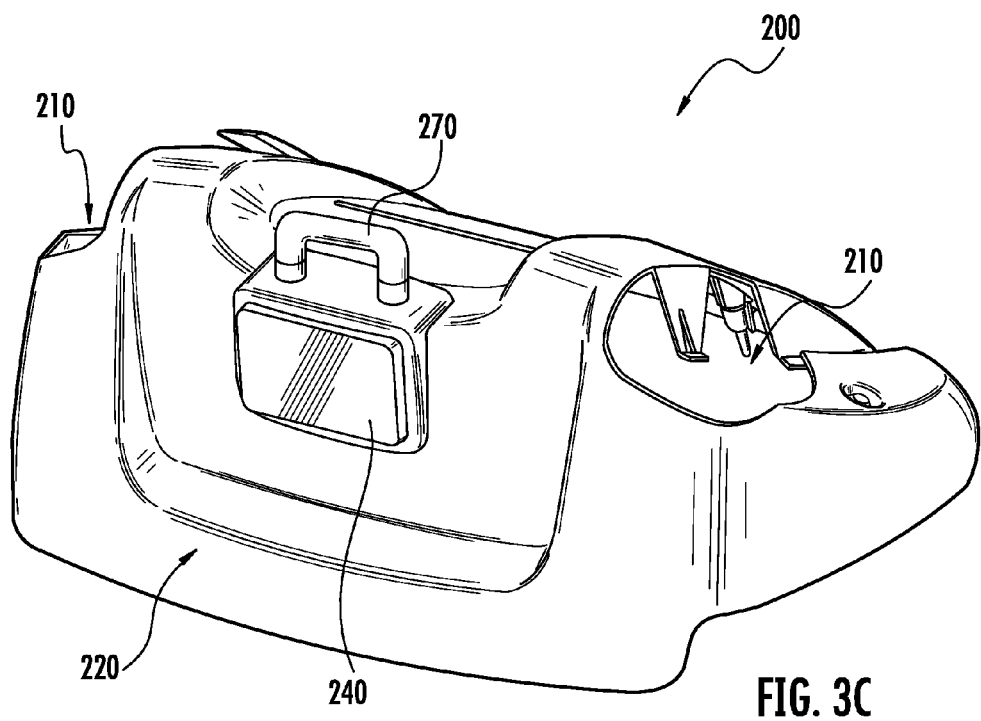
FIG. 3C illustrates a modification to the example embodiment of FIG. 3B in which the removable lamp includes a handle according to an example embodiment.

In the example of FIG. 2, all four of the lamp sidewalls 144 lie proximate to a respective one of the sidewalls 132 of the reception cavity 130. However, in some embodiments, less than all for of the lamp sidewalls 144 may lie proximate to a sidewall 132 of the reception cavity 130. FIG. 3, which includes FIGS. 3A, 3B and 3C, illustrates an alternative embodiment in which a reception cavity is defined with less than four sidewalls according to an example embodiment. In this regard, FIG. 3A illustrates a perspective view of an example removable lamp disposed in an accessory panel in the form of a walk behind product console according to an example embodiment. FIG. 3B illustrates a perspective view of the removable lamp of FIG. 3A removed from a reception cavity of the console according to an example embodiment. FIG. 3C illustrates a modification to the example embodiment of FIG. 3B in which the removable lamp includes a handle according to an example embodiment.

Referring now to FIG. 3, a console 200 may be provided for positioning between, or otherwise in connection with, arms of a handlebar assembly. Thus, like in FIG. 2, the console 200 includes receiving holes 210 through which arms, handles, or other portions of a handlebar assembly may be passed. The console 200 may include a face 220 including a reception cavity 230 for receiving a removable lamp 240. The face 220 of the console 200 may be oriented in any desirable direction relative to the handlebar assembly, or other component(s) to which the console 200 may be coupled or affixed.

A body of the removable lamp 240 may have any of a number of geometric shapes, as discussed above. However, this example embodiment shows the removable lamp 240 with a front face 242, four rectangular lamp sidewalls 244, and a back face. As shown in FIG. 3A, when inserted into the reception cavity 230 for stowage, the back face may be substantially (although not necessarily completely) disposed within the reception cavity 130 and at least a portion of only three of the lamp sidewalls 244 may also be disposed within the reception cavity 230. As such, for example, one of the lamp sidewalls 244 (e.g., a top sidewall) may be completely outside of the reception cavity 230 (along with the front face 242) when the removable lamp 240 is stowed.

The reception cavity 230 may include three sidewalls 232 and a back wall 234. The sidewalls 232 of the reception cavity 230 may be configured to correspond to the shape of the removable lamp 240. In particular, the sidewalls 232 may be shaped to correspond to the shape of respective ones of the lamp sidewalls 244 with which each of the sidewalls 232 comes into contact when the removable lamp 240 is stowed. The lamp sidewalls 244 of this example embodiment may define an external periphery of the removable lamp 140 that is slightly smaller in size than an internal periphery of the reception cavity 230 defined by the sidewalls 232.

In some embodiments, the removable lamp 240 may be snapped, slid or otherwise placed into detachable coupling or connection with the reception cavity 230. Although detents may be used, as described in connection with the example of FIG. 2, some alterantive embodiments may employ one or more guide posts or a guide plate 236. The guide plate 236 may provide a surface along which a portion of the removable lamp 240 (e.g., a guide slot 246) may slide to align the removable lamp 240 properly for storage in the reception cavity 230 and to provide a component for holding the removable lamp 240 in position. The guide slot 246 and/or the guide plate 236 may include detents, ridges and/or the like to engage corresponding detent receivers, valleys and/or the like in an opposing surface when the removable lamp 240 is stowed.

In an example embodiment, the removable lamp 240 may receive power from the walk behind product itself via a power cord 260. However, in some embodiments, rather than simply being packed into a void space within the reception cavity 230, the power cord 260 may be refracted into the console 200. For example, the guide plate 236 may include a cord slot 238 through which the power cord 260 may be withdrawn into a void space defined behind a portion of the guide plate 236 by a cord retractor (not shown). The cord retractor may automatically coil the power cord 260 (e.g., onto a reel) when tension is not applied to keep the power cord 260 extended. In some cases, a portion of the back face of the removable lamp 240 may be removed to facilitate provision of space between the guide plate 236 and the back wall 234 of the reception cavity 230 for retraction and storage of the power cord 260.

In this example also, the removable lamp 240 may include textured or embossed patterns over at least a portion of the lamp sidewalls 244 to facilitate gripping of the removable lamp 240 to aid in removal from the reception cavity 230. However, some example embodiments may further facilitate holding onto the removable lamp 240 when it is removed from the reception cavity 230, and facilitate extraction of the removable lamp 240, by adding a handle 270 to the removable lamp 240. In the example shown in FIG. 3C, the handle 270 is disposed at a top side of the removable lamp 240 (e.g., extending off of the top sidewall of the removable lamp 240 in a direction substantially perpendicular to a surface of the top sidewall). In such an example, the removable lamp 240 may be withdrawn from the reception cavity 230 by pulling the removable lamp 240 upward, or in a direction that is substantially parallel to the surface of the back wall 234 (and/or the guide plate 236). As such, in the example embodiment of FIG. 3, the removable lamp may slide into and out of the reception cavity 230. Although not shown, in some embodiments, a retractable detent may be provided (e.g., with a thumb release or other release mechanism) to enable extension of the retractable detent for holding the removable lamp 240 in place or enable retraction of the retractable detent to allow the removable lamp 240 to be removed.

Figure 4:
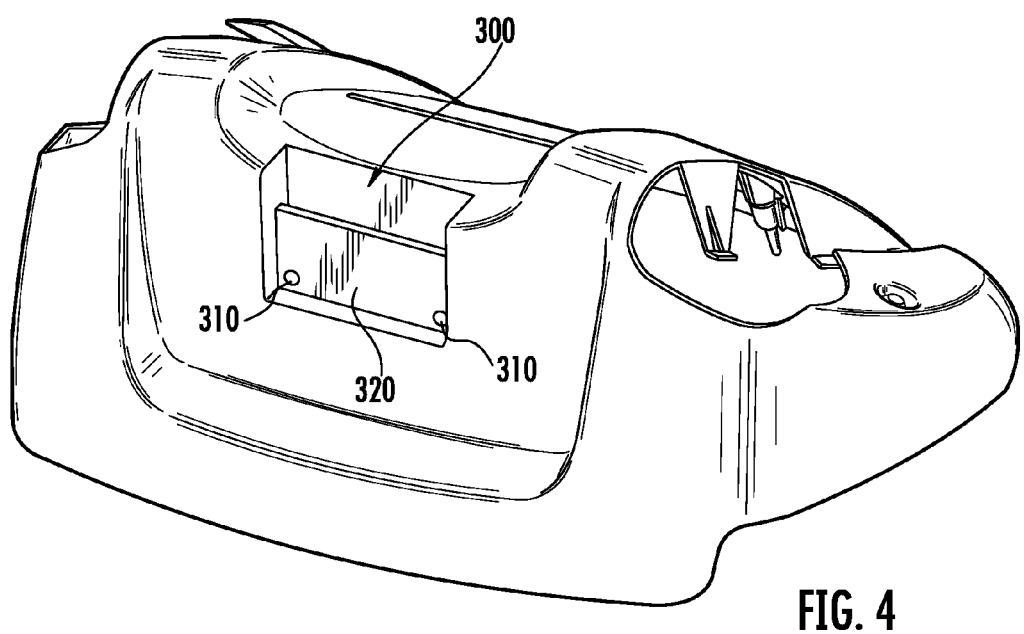
FIG. 4 illustrates an example reception cavity that may include charging contacts that may supply electricity to charge rechargeable batteries of a removable lamp of some example embodiments.

Although the removable lamp (140 or 240) may be powered from a console using a cord (e.g., power cord 170 or 270) in some cases, the removable lamp may be cordless (e.g., battery powered) in other example embodiments. The batteries may be disposable batteries in some cases. However, in other example embodiments, the batteries may be rechargeable batteries. Moreover, in some example embodiments, a console may be provided via which the rechargeable batteries of a removable lamp may be recharged. FIG. 4 illustrates an example reception cavity 300 that may include charging contacts 310 that may supply electricity to charge rechargeable batteries of a removable lamp of some example embodiments. In such an example, the charging contacts 310 may come into physical contact with corresponding contacts of the removable lamp when the removable lamp is stowed in the reception cavity. As such, for example, the charging contacts 310 may be positioned on a guide member such as guide plate 320. However, the charging contacts 310 could alternatively be placed at another location within the reception cavity 300 such as on one or more sidewalls of the reception cavity 300.

Figure 5:
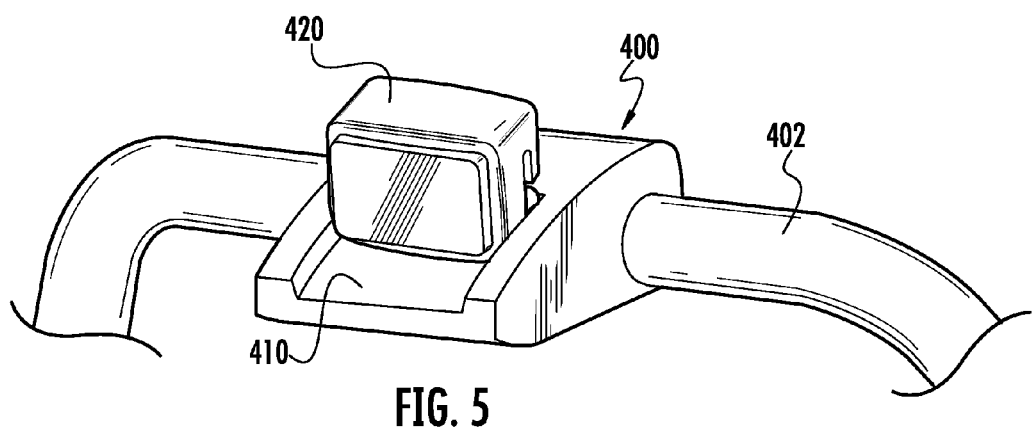
FIG. 5 illustrates an example of a mounting receptacle that may be provided apart from any particular accessory panel according to an example embodiment.

As discussed above, in some cases, the accessory panel may be an example of a mounting receptacle for a removable lamp. However, in some embodiments, the removable lamp may be connected to the outdoor power equipment device apart from an accessory panel. FIG. 5 illustrates an example of a mounting receptacle 400 that may be provided in a form that is not necessarily a panel, or an accessory panel. In this regard, for example, the mounting receptacle 400 may attach to an arm 402 of a handlebar assembly. The arm 402 may be one of the arms or a crossbar of a handlebar assembly. However, the mounting receptacle 400 may generally be mounted to any component of an outdoor power equipment device. In an example embodiment, the mounting receptacle 400 may then include a reception sleeve 410, which may be provided in the form of a U shaped channel. A removable lamp 420 may be sized to slide within the reception sleeve 410 to be held in the reception sleeve 410 by frictional contact, a releasable holding mechanism, snap fit, or other methods in order to hold the removable lamp 420 in place.

Some example embodiments may therefore enable operators of a walk behind product to direct light to any desirable location proximate to the walk behind product using a light that is powered from the walk behind product itself. However, in some cases, the removable lamp may be battery powered using disposable or rechargeable batteries. In the case where rechargeable batteries are used, the batteries may actually be charged from the walk behind product itself.

The removable lamp may be detachably connected to the walk behind product by any of a number or mechanisms (e.g., snap fit using detents, or slidable connection). Accordingly, the operator may be enabled to direct light to areas other than those directly in front of the walk behind product including the direction of light to specific areas of the walk behind product itself in low light conditions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An outdoor power equipment device comprising:
    a mobility assembly supporting a device frame of the outdoor power equipment device and enabling an operator of the outdoor power equipment device to facilitate movement of the outdoor power equipment device; and
    a mounting receptacle coupled to the device frame, the mounting receptacle including a removable lamp operable to provide light at least when removed from the mounting receptacle, wherein the mounting receptacle comprises an accessory panel including a reception cavity configured to receive at least a portion of the removable lamp for detachable storage of the removable lamp.

2. The outdoor power equipment device of claim 1, further comprising a snap assembly to enable the removable lamp to be detachably secured to the mounting receptacle.

3. The outdoor power equipment device of claim 2, wherein the snap assembly includes at least one detent disposed at the mounting receptacle and at least one corresponding detent receiver disposed at the removable lamp, or includes at least one detent disposed at the removable lamp and at least one corresponding detent receiver disposed at the mounting receptacle.

4. The outdoor power equipment device of claim 1, wherein an orientation of the removable lamp is adjustable within the reception cavity.

5. An accessory panel of an outdoor power equipment device comprising:
    a removable lamp detachably connectable to the accessory panel; and
    a reception cavity disposed in the accessory panel to receive lamp sidewalls of the removable lamp responsive to insertion of the removable lamp into the reception cavity,
    wherein the removable lamp is operable to provide light at least when removed from the reception cavity.

6. The accessory panel of claim 5, further comprising a snap assembly to enable the removable lamp to be detachably secured to the accessory panel.

7. The accessory panel of claim 6, wherein the snap assembly includes at least one detent disposed at the accessory panel and at least one corresponding detent receiver disposed at the removable lamp, or includes at least one detent disposed at the removable lamp and at least one corresponding detent receiver disposed at the accessory panel.

8. The accessory panel of claim 5, wherein the removable lamp is cordless.

9. The accessory panel of claim 5, wherein the removable lamp is powered from the accessory panel via a retractable power cord.

10. The accessory panel of claim 5, wherein the removable lamp is powered from the accessory panel via a coiled power cord that is stored in the reception cavity responsive to insertion of the removable lamp into the reception cavity.

11. The accessory panel of claim 5, wherein the removable lamp is battery powered via a rechargeable battery, and wherein the rechargeable battery is charged via contacts positioned within the reception cavity.

12. The accessory panel of claim 5, wherein the removable lamp includes a handle disposed to be accessible when the removable lamp is detachably stored in the reception cavity.

13. The accessory panel of claim 5, wherein the removable lamp includes a handle disposed to be inaccessible when the removable lamp is detachably stored in the reception cavity.

14. The accessory panel of claim 5, wherein the reception cavity includes one or more guide members disposed therein to facilitate detachable insertion of the removable lamp into the reception cavity.

15. The accessory panel of claim 5, wherein the reception cavity includes four sidewalls configured to be proximate to corresponding ones of four lamp sidewalls of the removable lamp responsive to insertion of the removable lamp into the reception cavity.

16. The accessory panel of claim 5, wherein the reception cavity includes no more than three sidewalls configured to be proximate to corresponding ones of three lamp sidewalls of the removable lamp responsive to insertion of the removable lamp into the reception cavity.

17. The accessory panel of claim 16, wherein a fourth lamp side wall includes a handle accessible by an operator when the removable lamp is inserted into the reception cavity.

18. The accessory panel of claim 5, wherein the walk behind yard maintenance device is a snow blower, lawn mower, tiller, trimmer or brush cutter.

19. The accessory panel of claim 5, wherein the reception cavity is disposed in a headlight position with respect to the outdoor power equipment device.

\* \* \* \* \*